United States Patent [19]

Duembgen et al.

[11] 4,301,126
[45] Nov. 17, 1981

[54] PROCESS FOR DESTROYING PHOSGENE

[75] Inventors: Gerd Duembgen, Dannstadt-Schauernheim; Erfried Voelkl, Frankenthal; Gerhard Pforr, Ludwigshafen, all of Fed. Rep. of Germany

[73] Assignee: BASF Aktiengesellschaft, Fed. Rep. of Germany

[21] Appl. No.: 143,476

[22] Filed: Apr. 24, 1980

[30] Foreign Application Priority Data

May 16, 1979 [DE] Fed. Rep. of Germany ....... 2919661

[51] Int. Cl.$^3$ .................... B01D 53/34; C01B 17/01
[52] U.S. Cl. .................... 423/240; 423/437; 423/481
[58] Field of Search ............... 423/240, 437, 481, 245

[56] References Cited

U.S. PATENT DOCUMENTS 2,832,670  4/1958  Wollthan ........................ 423/481
3,314,753  4/1967  Richert et al. .................. 423/481
4,212,852  7/1980  Aibe et al. ...................... 423/245

FOREIGN PATENT DOCUMENTS 961681   4/1957  Fed. Rep. of Germany ...... 423/240
1667438  6/1971  Fed. Rep. of Germany ...... 423/240
2131403 12/1972  Fed. Rep. of Germany ...... 423/240

Primary Examiner—Earl C. Thomas
Attorney, Agent, or Firm—Keil & Witherspoon

[57] ABSTRACT

To destroy phosgene contained in gases, the phosgene is decomposed catalytically in the presence of active carbon by hydrolysis with water vapor, in the absence of liquid water, at above the dew point of water.

3 Claims, 1 Drawing Figure

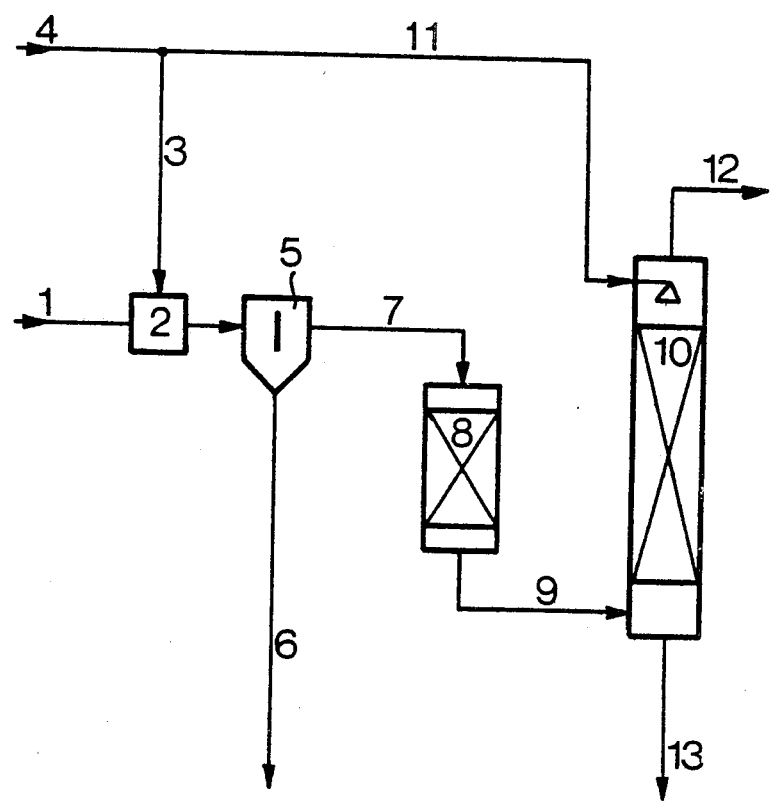

PROCESS FOR DESTROYING PHOSGENE

The present invention relates to a process for removing phosgene from, and destroying phosgene in, phosgene-containing waste gases.

Phosgene, which is frequently present in waste gases, is known to be highly toxic and must therefore not be emitted. It must be destroyed quantitatively or converted to reaction products which are less harmful and can be removed simply and completely reliably from the waste gas. The destruction of the phosgene should if possible be carried out in such a way that useful products in the off-gas, for example chlorine, are not lost and can be reused.

A number of processes for destroying phosgene in, and removing phosgene from, waste gases have been disclosed. For example, the phosgene can be removed from the waste gases by washing with water or, preferably, with caustic alkali solutions. Processes in which the phosgene is decomposed by hydrolysis in the presence of catalytic substances have also been disclosed.

German Published Application DAS 1,667,438 discloses a process wherein a gaseous mixture which contains phosgene and water vapor is brought into contact with alkali-activated alumina at from 95° to 190° C. The process requires relatively high temperatures and is uneconomical because of the large amounts of energy required to heat the waste gases, which are in most cases at a lower temperature than that which is required.

Active carbon has also been disclosed as a catalyst for the catalytic decomposition of phosgene. According to German Patent No. 961,681, the phosgene is brought into intimate contact with active carbon and water. According to German Laid-Open Application DOS 2,131,403, an acid aqueous solution containing iron(II) chloride is employed in place of water.

However, all processes hitherto disclosed for destroying phosgene suffer from disadvantages which limit their usefulness. For example, hydrolytic decomposition of phosgene in a water wash process only takes place quantitatively if the residence time of the phosgene is sufficiently long. This can only be achieved by arranging several very large wash columns in series; as a result, the investment costs and operating costs are substantially increased. Processes which employ active carbon on to which liquids are trickled also require long residence times.

It should be noted that the residence times required to remove a certain amount of phosgene increase greatly with decreasing concentration of the phosgene, so that disproportionately voluminous apparatus must be provided particularly for the removal of small amounts of phosgene. The said wash columns have the further disadvantage that their capacity decreases with increasing periods of operation, due to solid contaminations in the liquids. The solid particles are preferentially deposited on the carbon bodies, leading to blockages. This further disadvantage could be avoided by an additional purification of the recycled liquids, but this would on the other hand again substantially increase the expense.

A further disadvantage of these processes is that the active carbon must be sprayed very uniformly with the liquid, i.e. in the case of sizable units it is, for example, advantageous to subdivide the layer of active carbon in the tower and to provide each layer with a separate water feed, or alternatively to use more than one tower (cf. German Patent No. 961,681).

It is true that in the case of washes with caustic alkalis, the residence time for complete destruction of the phosgene is short, since, however, the reaction produces carbon dioxide, which reacts with the caustic alkali, the latter must be constantly replenished, so that this also causes substantial operating costs, quite apart from the fact that the process is of at most very limited usefulness in the case of waste gases which additionally contain carbon dioxide.

Washing with caustic alkalis is therefore only useful in the case of waste gases which do not contain other constituents than phosgene capable of reacting with the caustic alkali solution, since otherwise the consumption of the latter is increased to an economically unacceptable degree.

It is an object of the present invention to provide a process by means of which the disadvantages of the conventional processes are eliminated, i.e. by means of which the destruction of the phosgene can be effected with short residence times and correspondingly small apparatus, at low temperatures and without the use of specially activated catalysts.

We have found that this object is achieved in a process for destroying phosgene contained in gases, by hydrolyzing the phosgene in the presence of active carbon, if the hydrolysis of the phosgene is carried out with water vapor, in the absence of liquid water, at above the dew point of water.

Surprisingly, when using the procedure according to the invention, it is possible to manage with substantially smaller beds of active carbon than are needed in the conventional processes in which the hydrolysis is carried out with liquid water. Using the process according to the invention, phosgene at extremely low concentrations can be removed from waste gases, for example down to concentrations which correspond to the water vapor saturation content of the gas at the particular temperature. The other constituents of the gas virtually do not interfere with the hydrolysis of the phosgene.

It is presumed that the phosgene and water vapor are absorbed in the pores of the active carbon and that the phosgene is hydrolyzed in this state. The ability to carry out the hydrolysis with relatively small volumes of active carbon is probably also attributable to this fact.

It is important that the hydrolysis is carried out in the absence of liquid water, since otherwise the capacity of a given bed for destroying phosgene is at least greatly reduced, and may even be entirely lost. For this reason, spraying the active carbon with water should be avoided, and care should be taken that water vapor does not condense in the active carbon bed.

An important advantage of the process according to the invention is that it proves possible to hydrolyze the phosgene quantitatively even at room temperature. For this reason, the phosgene-containing waste gases can be subjected to the treatment according to the invention directly, without prior heating. It is true that at elevated temperatures the capacity of a given active carbon bed to destroy phosgene is increased, i.e. a given concentration of phosgene can, at elevated temperatures, be effectively destroyed with a smaller amount of active carbon. Since the hydrolysis of phosgene takes place exothermically, it is advantageous to locate the active carbon bed in, for example, an insulated column, so that the bed is kept at an elevated temperature as a result of the heat evolved by the reaction, without external supply of heat. The hydrolysis can therefore advantageously be carried out at from 10° to 80° C., particularly advantageously at from 30° to 60° C. There are various possible ways of introducing the water vapor. It is particularly advantageous to introduce it together with the gas to be treated. For this purpose, the gas is saturated with water vapor in a conventional manner before entering the active carbon bed, and is advantageously allowed to pass through a mist collector in order to ensure that liquid water is not introduced into the active carbon bed. As a result of the heat liberated by the reaction the bed—particularly if located in a heat-insulated reactor—is kept at a higher temperature than that of the feed gas—and this reliably ensures that the temperature does not drop below the dew point. Using this method, the concentration of phosgene which can be destroyed in the waste gas to be treated is limited by the saturation concentration of water vapor in the waste gas. At 20° C., the concentration of $COCl_2$ which can be destroyed is about 2% by volume, but is increased with increasing temperature, in accordance with the increase in the saturation concentration of water vapor.

The procedure described has the advantage that the water vapor and the gas to be treated are in the form of a very homogeneous mixture and do not have to be dispersed in the reaction chamber. Of course it is also possible to introduce the gas to be treated, and the water vapor, separately from one another into the reaction chamber charged with active carbon. Because of its greater expense, this method is only to be preferred if the phosgene content in the waste gas to be treated is greater than 2% by volume.

The active carbon employed can be any commercial type with an inner surface area of, for example, from 500 to 1,800 $m^2/g$. In order to minimize the pressure drop in the reactor, it is advantageous to employ granular or pelleted active carbons corresponding to the fractions obtained between 4 mm and 8 mm mesh sieves.

The gases to be treated can be passed through the active carbon bed at space velocities of from about 500 to 2,500 parts by volume (S.T.P.) of gas mixture per hour per part by volume of active carbon. The height of the bed and the space velocity of the gas are advantageously selected so as to give residence times of from about 0.3 to 25 seconds.

The process may be carried out under atmospheric pressure or superatmospheric pressure.

The drawing sets forth in diagrammatical form the phosgene destruction unit described below in Example 2.

Summarizing, it can be stated that the process according to the invention has a high phosgene destruction capacity even at low temperatures, i.e. that even at these temperatures phosgene is analytically no longer detectable in the gas leaving the active carbon bed, and the reaction can be carried out in a small apparatus. The process according to the invention is applicable to the treatment of all phosgene-containing waste gases, provided these do not contain any components which react with the active carbon. The process is, for example, particularly suitable for treating waste gases which arise from the synthesis of aluminum chloride by reacting alumina or bauxite with mixtures of carbon monoxide and chlorine, or with phosgene. The activity of the active carbon does not diminish substantially even after months of operation, i.e. regeneration of the carbon is not necessary.

The treated gases contain hydrogen chloride gas and $CO_2$. The former can easily be worked up to give hydrochloric acid, whilst $CO_2$ can be released into the atmosphere.

EXAMPLE 1

(A) A double-walled column having an internal diameter of 2 cm and a height of 30 cm is charged with a 20 cm high active carbon bed (inner surface area 1,580 $m^2/g$, pore size 5–15 Å), and per hour 96 liters of a gas mixture consisting of 99.6% by volume of $CO_2$ and 0.4% by volume of $COCl_2$ are introduced, corresponding to a space velocity of about 1,500 and a residence time of 2.35 sec. The gas mixture, which is at 20° C., is saturated beforehand with water vapor and passes through a mist collector before entering the column. The active carbon bed is kept at 25° C.

Analytically, phosgene is no longer detectable in the off-gas leaving the column, even after 24 hours' operation.

(B) The same gas mixture, which has however not been saturated with water vapor, is introduced, under the same conditions, into the column described in (A). Instead of saturation with water vapor, 1.400 $cm^3$ per hour of liquid water are sprayed in a finely divided form into the column, in the same direction of flow as the gas.

After the phosgene-containing mixture has been introduced for 1 minute, phosgene is already detectable analytically in the off-gas. After a further 4 minutes the phosgene content in the stream of gas leaving the column—which has risen continuously—reaches a value in excess of 100 ppm by volume. On reaching this value, the experiment is discontinued.

EXAMPLE 2

In the phosgene destruction unit illustrated diagrammatically in the FIGURE, a stream of waste gas of 70 $m^3$(S.T.P.)/h, which is at 20° C. and contains 0.8% by volume of phosgene, is introduced through line 1, whilst per hour 200 liters of water are fed to a mixing device 2 through line 3. The waste gas charged with water droplets passes into the mist collector 5 via line 4. Here, the water droplets are completely deposited and drawn off through line 6. The waste gas, which is charged with water vapor but is free from water droplets, is fed to the column 8 through line 7.

The column is filled with wide-pored active carbon in the form of cylindrical moldings (pore diameter from 5 to 15 Å). The diameter of the bed is 300 mm and its height 1,600 mm. The bed is at 30° C. The space velocity, based on conditions of 20° C. and 760 mm Hg, is 660 and the residence time is 5.7 seconds.

The off-gas, in which phosgene is no longer detectable, leaves the column (8), together with the hydrolysis products HCl and $CO_2$, through line 9 and enters the column 10. In this column, water is sprayed into the upper part through line 11 and travels in counter-current to the gas. This washes out the HCl, and the solution is drawn off through line 13. The off-gas, which is now also free from HCl, is discharged through line 12, for example into a stack.

Even after 3 months' operation, no phosgene is detectable in the off-gas leaving column 8.

EXAMPLE 3

The unit described in Example 2 is operated as in Example 2 except that the column is heat-insulated with a suitable material. As a result, the active carbon bed rises to 45° C. The height of the bed can be reduced to 900 mm without phosgene being detectable—even after several months' operation—in the off-gas issuing from line 9.

We claim:

1. A process for destroying phosgene contained in gases which comprises: passing the gas containing phosgene mixed with water vapor and in the absence of liquid water through a bed of active carbon at a temperature of from 10° to 80° C.

2. The process of claim 1, wherein the process is carried out at a temperature of from 30° to 60° C.

3. The process of claim 1, wherein active carbon having an inner surface area of from 800 to 1,500 $m^2/g$ is employed.

* * * * *